Sept. 27, 1966    J. G. SIMMONS    3,275,844
ACTIVE THIN FILM QUANTUM MECHANICAL TUNNELING APPARATUS
Filed Nov. 16, 1962    3 Sheets-Sheet 1

INVENTOR.
JOHN G. SIMMONS
BY
Carl Fissell Jr.
AGENT

Sept. 27, 1966     J. G. SIMMONS     3,275,844
ACTIVE THIN FILM QUANTUM MECHANICAL TUNNELING APPARATUS
Filed Nov. 16, 1962     3 Sheets-Sheet 3

$(V_{eb})_{max} = V_{d1}$
$(V_{bc})_{max} = V_{d2}$
$E_{max} = e(V_{eb})_{max} = eV_{d1}$ $(V_{eb})_{max} = V_{d1} + \frac{\Psi_2 - \Psi_1}{e}$
$(V_{bc})_{max} = V_{d2} + \frac{\Psi_2 - \Psi_1}{e}$
$E_{max} = e(V_{eb})_{max}$
$\phantom{E_{max}} = e(V_{d1})_{max} + \Psi_2 - \Psi_1$ INVENTOR.
JOHN G. SIMMONS
BY
*Carl Fissel Jr*
AGENT

United States Patent Office 3,275,844
Patented Sept. 27, 1966

3,275,844
ACTIVE THIN FILM QUANTUM MECHANICAL TUNNELING APPARATUS
John G. Simmons, Norristown, Pa., assignor to Burroughs Corporation, Detroit, Mich., a corporation of Michigan
Filed Nov. 16, 1962, Ser. No. 238,164
3 Claims. (Cl. 307—88.5)

This invention relates to solid state electron apparatus and more particularly to improved multilayer solid state electron circuit apparatus wherein relatively high energy electron injection levels are attained by means of the so-called electric tunneling effect between dissimilar metal layers as a result of the contact potential difference across the insulator separating such layers.

It is an important object of the invention to provide improved multiple layer solid state electron apparatus having relatively high energy injection levels.

Another object is to provide dissimilar metal multilayer solid state electron apparatus operating by means of the electric tunneling effect.

Still another object is to provide solid state electron apparatus employing thermally formed or evaporated oxides as the dielectric between the operating electrodes of the apparatus.

A further object is the provision of a dissimilar metal multilayer solid state electron device permitting the injection of electron energy above the Fermi level from a metal layer of one work function to that of a higher work function whereby energy gains of the order of two or better are attained.

A still further object is to provide unitary solid state electrical circuit assemblies employing multiple thin metallic films insulated from one another by insulating layers of the order of 35 A. thick.

It is also an object to provide improved solid state electron apparatus including multiple metallic thin film layers forming a complete electrical circuit operating on the electric tunneling principle without the need for protective encapsulation.

In accordance with the foregoing objects and first briefly described, the present invention comprises improved solid state electron apparatus wherein multilayer tunnel junctions employ dissimilar metallic electrodes separated by a suitable dielectric thereby developing an intrinsic electrical field in the dielectric as a result of the contact potential difference between the dissimilar electrodes. Upon the application of a negative potential to the electrode of lower work function an increase in electron injection energies of twice the difference in work function is produced over and above that possible in a device utilizing electrodes having similar work functions.

Additional objects and features characterizing the present invention are set forth with particularity in the appended claims. The invention itself both as to its organization and method of operation, as well as additional objects and advantages thereof are best understood from the description which follows when read in conjunction with the accompanying drawings and appended claims:

Figure 1:
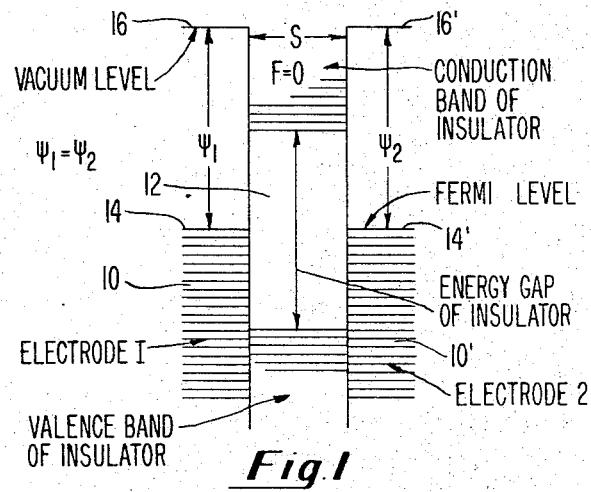
FIG. 1 is an energy level diagram of a tunnel junction with zero voltage applied between electrodes having similar work functions.

According to the laws of thermodynamics, in a system in equilibrium, FIG. 1, the Fermi levels e.g., the level to which electrons characteristically fill a metal, must line up. Also, thermodynamics makes it clear that the application of an electrical potential between two plates or electrodes of a system such as that of FIG. 1, causes the Fermi levels to separate by an amount $eV$ equal to the potential difference.

It has long been recognized, although up to the present time no known use was made of the knowledge, that when two dissimilar metal electrodes or plates, separated by a very thin dielectric S are brought into abutting relationship with the dielectric (thereby effectively forming a capacitor) a so-called contact potential $V_c$ is developed across the plates or electrodes equal in magnitude to $\Psi_2 - \Psi_1/e$ where $\Psi_1$ and $\Psi_2$ represent the work functions of the respective electrode materials. The work function is characterized as the distance from the Fermi level to the vacuum level. The latter being the level at which electrons are free. For purposes of the present description and as used herein the term "work function" is the energy needed to remove an electron from a metal to infinity (see Introduction to Solid State Physics, Kittel, John Wiley and Son, p. 226), where the electron initially had an energy equal to the Fermi level of the metal. An intrinsic field is thus developed in the dielectric or insulator as a result of the contact potential difference between the two electrodes. This potential can be deduced by measuring the capacity between the two electrodes, e.g., by moving the plates toward and away from each other. The field in the insulator is equal to the contact potential $V_c$ divided by the thickness of the insulator $S$ or the distance between the plates and may be derived by the formula: $F_i = (\Psi_2 - \Psi_1/es)$ where $F_i$ is the intrinsic field, $s$ is the thickness of the insulator or dielectric, $\Psi_1$ and $\Psi_2$ are the work functions of the electrodes and $e$ is the electronic charge.

Such intrinsic fields in solid state electron tunnel junction apparatus are extremely high particularly where the dielectric is very thin, e.g., (<100 A.). In a beryllium (Be) and gold (Au) system, for example, in which a contact potential difference $V_c$ of approximately one electron volt exists and wherein the insulator-dielectric associated therewith is approximately 50 A. thick, an electric field, hereinafter called an intrinsic field, as given by: $F_i = V_c/s$. This field is equivalent to 1/50 A. which is=

$$\frac{1}{50 \times 10^{-8}_{v/cm.}} = 2 \times 10^6_{v/cm.}$$

which is very close to the breakdown strength for the best known dielectrics. These phenomena in combination with certain structural arrangements are taken advantage of in the present invention in a manner to effect a substantial and significant increase in the injection energies in solid state electron tunnel junction devices thereby effectively increasing the overall efficiency of such apparatus, as will now be described.

Referring first to FIG. 1 there is seen an energy level diagram of a solid state electron device, e.g., thin film tunnel junction comprising two substantially similar conductive material layers formed as metal electrodes 10 and 10' separated by an extremely thin insulator-dielectric 12, such for example, as the oxide of the metal 10. It is noted that the insulator 12 may be formed in a number of different ways and by varying means such for example, as by evaporation or sputtering. Since the metals are similar their work functions $\Psi_1$ and $\Psi_2$ respectively, are also similar. Also, for a system in equilibrium such as this is and with zero potential between electrodes 10 and 10', F, the field in the insulator 12 is equal to zero (0). The Fermi levels 14 and 14' line up as do the vacuum levels 16 and 16'.

Figure 2:
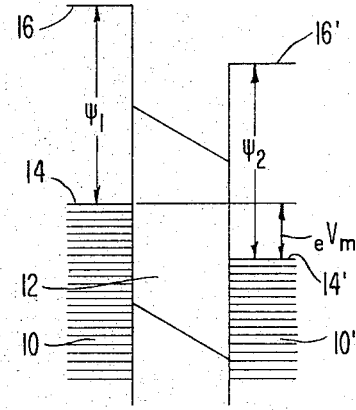
FIG. 2 is an energy level diagram of a tunnel junction similar to that of FIG. 1 wherein the Fermi levels are separated by an amount equivalent $eV$ the product of the applied bias and the electronic charge.

When a potential bias V is applied to the device of FIG. 1 the Fermi levels 14 and 14' immediately separate by an energy associated with the potential V which, as seen in FIG. 2, is an amount $eV$ where $e$ is the electronic charge. Thus the separation of Fermi levels is proportional to the voltage applied times the electronic charge. Assuming that $s$ is the thickness of the insulator 12 and that $F_d$ is the dielectric strength thereof, i.e., the maximum field in S before breakdown occurs, then the maximum voltage $V_m$ that can be placed across a device such as this having two similar electrodes is $V_m = F_d S$, since the voltage between two electrodes separated by an insulator is the product of the electrical field between the electrodes or plates and the distance therebetween or the separation of such electrodes.

Quantum mechanics postulates that the tunneling electrons flow from one energy level to an energy level directly opposite thereto. Hence, the electrons from the Fermi level of electrode 10 are injected directly into electrode 10' with an energy $eV$ above the Fermi level of the latter electrode. Since the Fermi level denotes the maximum energy of the resident electrons in electrode 10' it is seen that the electrons from electrode 10 are injected into electrode 10' with an energy $eV$ above the maximum energy of the resident electrons. Thus, the injected electrons may be termed "hot" electrons. It is apparent then that these injected electrons have gained an energy of $eV$ in tunneling from electrode 10 to electrode 10'. Thus the maximum energy $E_m$ with which electrons can be injected from the first electrode 10 into the second electrode 10' is $E_m = eV_m = eF_d S$.

Figure 3:
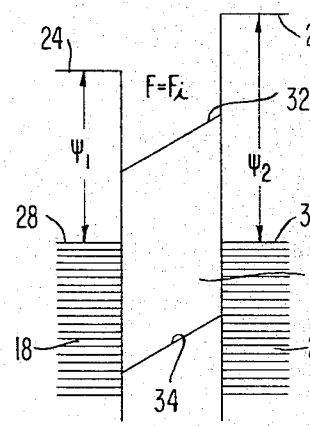
FIG. 3 is an energy level diagram of a tunnel junction utilizing dissimilar electrodes and illustrating the asymmetric barrier resulting from the contact potential thus developed.

The energy level diagram of FIG. 3 illustrates the case of two dissimilar electrodes 18 and 20 in an unbiased condition and separated by a dielectric 22 which, as stated before, may be the atmospherically derived oxide of the metal 18. It is noted that the vacuum levels 24 and 26 do not line up although the Fermi levels 28 and 30 are in line as a result of the transfer of negative charges from the $\Psi_1$ electrode 18 to the $\Psi_2$ electrode 20. This results in surface charges which create the aforementioned intrinsic electrical field $F_i$ in the insulator 22. A contact potential $V_c$ is associated with this field and is given by $V_c = (\Psi_2 - \Psi_1/e)$. This field $F_i$ is denoted by and is proportional to, the slope of the lines 32 and 34, the bottom of the conduction band and the top of the valence band, respectively, of the insulator 22.

The field within the insulator S which arises because of the contact potential difference between the two electrodes is given by: $F_i = (\Psi_2 - \Psi_1/es)$ where $s$ is the thickness of the insulating layer 22; $\Psi_1$ and $\Psi_2$ are the work functions of the electrodes 18 and 20 and $e$ is the electronic charge. The effect of the field $F_i$ is to produce the asymmetrical potential barrier 32 between the two electrodes, as shown. The grade of the sloping lines 32 and 34 is equal to the product of the electronic charge and the electronic field in the insulator. Since, as aforementioned the contact potential is denoted by $$V_c = (\Psi_2 - \Psi_1/e)$$

i.e., the work function divided by the electronic charge is a unit of voltage; it follows that the intrinsic field $F_i = V_c/s = (\Psi_2 - \Psi_1/es)$.

Figure 4:
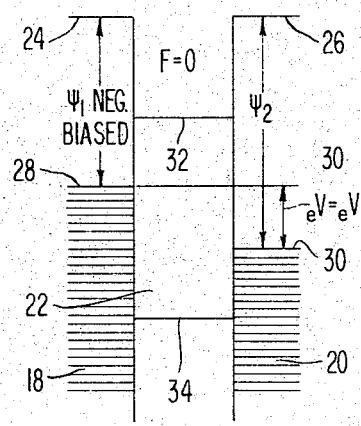
FIG. 4 is an energy level diagram similar to FIG. 1 with the electrode of lower work function negatively biased by an amount equal to the contact potential thereby reducing the intrinsic field in the insulator to zero.
Figure 5:
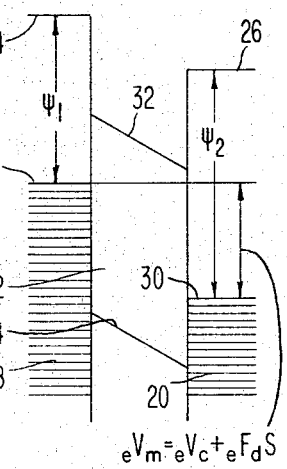
FIG. 5 is an energy level diagram similar to FIG. 4 illustrating the field reversal in the insulator due to the application thereto of a potential between electrodes with the electrode of lower work function still negatively biased in an amount greater than the contact potential.

As seen in the energy level diagram of FIG. 4, the two dissimilar electrodes 18 and 20 are arranged such that an external potential $V = V_c$ the contact potential is applied across the insulator 22, with the metal 18 of lower work functions $\Psi_1$ being biased negatively. The vacuum levels 24 and 26 line up while the Fermi levels 28 and 30 are displaced by an amount $eV = eV_c$. The slope of the lines 32 and 34 indicating the bottom of the conduction band and the top of the valence band respectively, are horizontal indicating the the field F in the insulator 22 is reduced to zero. Since the electrons travel from the negatively biased electrode to the positively biased electrode there is a continuous injection of electrons from electrode $\Psi_1$ to electrode $\Psi_2$ of energy $eV = eV_c$. From this it follows that the injection energy $E = eV_c = \Psi_2 - \Psi_1$ since the contact potential $V_c$ is $(\Psi_2 - \Psi_1/e)$, as stated in connection with FIG. 3. Thus by first applying a voltage between electrodes $\Psi_1$ and $\Psi_2$ equal to the difference in work functions divided by the electronic charge $e$, the field F in the insulator is decreased from its intrinsic value $V_c/s$ to zero. This enables the application of additional potential (voltage) $V_d$ between electrodes since the field in the insulator S can be increased in the opposite direction from 0 by an amount equal to $F_d$, the dielectric strength of the insulator as shown in FIG. 5. It is immediately apparent therefrom that the field in the insulator S undergoes a complete reversal from the condition shown in FIG. 3 to that illustrated in FIG. 5.

Figure 6:
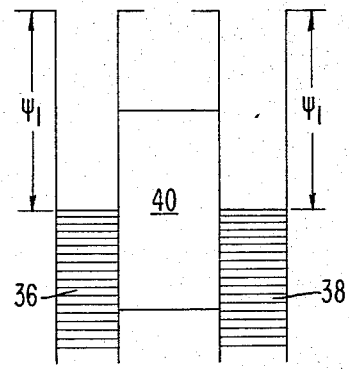
FIG. 6 represents an energy level diagram of a two electrode tunnel junction system employing similar electrodes without the application of any potential bias thereto.
Figure 7:
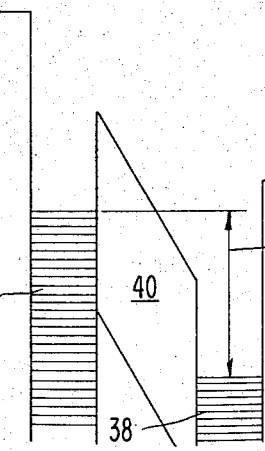
FIG. 7 is an energy level diagram similar to FIG. 6 but with a potential difference applied across the two electrodes indicating the maximum injection energy of electrons from one electrode to the other.

In view of the foregoing it is seen that the maximum voltage $V_m$ which can be applied between electrodes $\Psi_1$ and $\Psi_2$ is $V_m = V_c + F_d S$. Thus it follows that the maximum energy $E_m = eV_m$ with which electrons can be injected from one electrode to another in a system of two dissimilar electrodes is $E_m = eV_c + eF_d S$ which is equivalent to $(\Psi_2 - \Psi_1) + eF_d S$. It should be apparent therefore that by virtue of the invention electron energies can be increased by an amount equal to the difference in work function over the case of the similar electrode device using the same insulating material. It has been observed that the contact potential $V_c$, depending on the choice of materials for the metal electrodes ($\Psi_1$ and $\Psi_2$), can be approximately two volts. Thus, if the maximum electron injection energy in a system incorporating similar metals is two electron volts then by employing dissimilar metals as described hereinbefore, this figure can be effectively doubled.

Where it is necessary or desirable to get emission into a vacuum, e.g., cold cathode type device, the construction of FIG. 6 may be employed. In this arrangement, as seen in the energy diagram, similar electrodes 36 and 38 are used, i.e., the work functions are the same separated by an insulator 40 and no bias is applied to the device. Assuming $V_d$ to be the breakdown voltage of the insulator film 40 then the maximum energy $E_m$ with which electrons can be injected from $\Psi_1$ electrode 36 to $\Psi_1$ electrode 38 is going to be $E_m=eV_d$. If this energy, as seen in FIG. 7, is less than $\Psi_1$ the work function of electrode 36 (i.e., $eV_d<\Psi_1$) then electrons cannot escape from electrode 38 into vacuum, since the electrons are injected into the right hand $\Psi_1$ material 38 below the vacuum level and it is understood that in order for the electrons to escape they must be injected above the vacuum level. Here, in order to escape into vacuum the electrons must surmount the potential barrier afforded by electrode 38, i.e., the work function $\Psi_1$.

It should be readily apparent however, from what has been stated hereinbefore, that the problem of causing electron emission into vacuum can be solved by the expedient of employing dissimilar metal electrodes thereby to produce the intrinsic field earlier referred to herein so that higher injection energies can be used with the device.

Figures 8A, 8B:
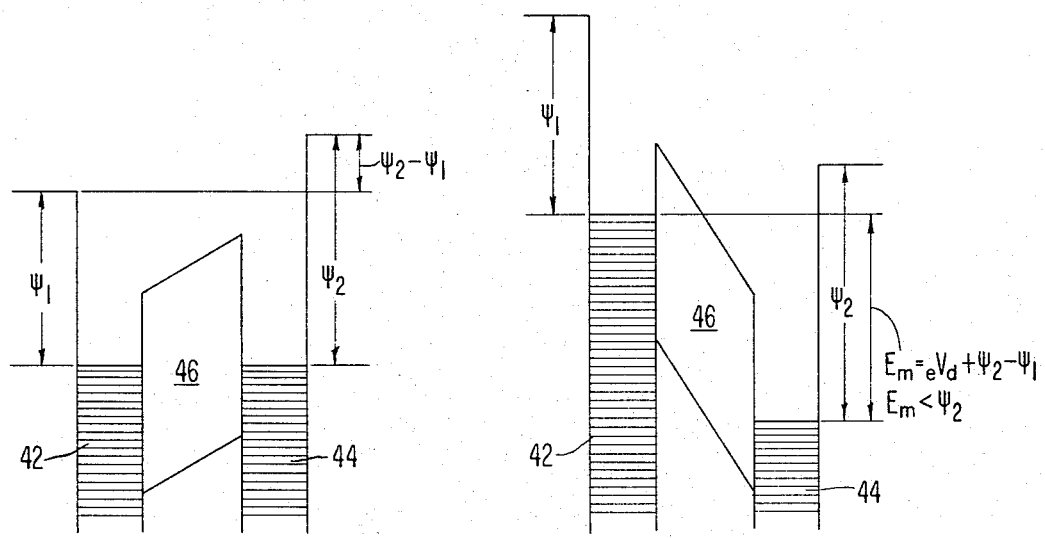
FIGS. 8a and 8b are energy level diagrams similar to FIGS. 6 and 7.

In the dissimilar electrode device of FIGS. 8a and 8b dissimilar metal electrodes 42 and 44 are seen to be separated by an insulator 46. As shown, electrons are injected from $\Psi_1$ to $\Psi_2$. Here the maximum energy with which electrons can be injected is not $eV_d$, the product of the breakdown voltage of the insulator 46 and the electronic charge $e$, but rather, it is $eV_d$ plus the difference in work functions $\Psi_2-\Psi_1$. It is of course, immediately clear that by making the work function of electrode 44 $\Psi_2$ greater than $\Psi_1$ so as to gain an increase in injection energy, the height of the potential barrier of the $\Psi_2$ electrode is proportionately increased by an amount $\Psi_2-\Psi_1$, FIG. 8a. Since the maximum energy $E_m$ is equal to $eV_d+\Psi_2-\Psi_1$, and since from the energy diagrams of FIGS. 6 and 7 $eV_d<\Psi_1$ and thus the maximum energy $E_m<\Psi_1+\Psi_2-\Psi_1$, it follows therefore that $E_m<\Psi_2$ and thus the electrons are still trapped, FIG. 8b.

$$E_m=eV_d+\Psi_2-\Psi_1$$
but
$$eV_d<\Psi_1$$
$$E_m<\Psi+\Psi_2-\Psi_1$$
$$E_m<\Psi_2$$

Figures 9, 10:
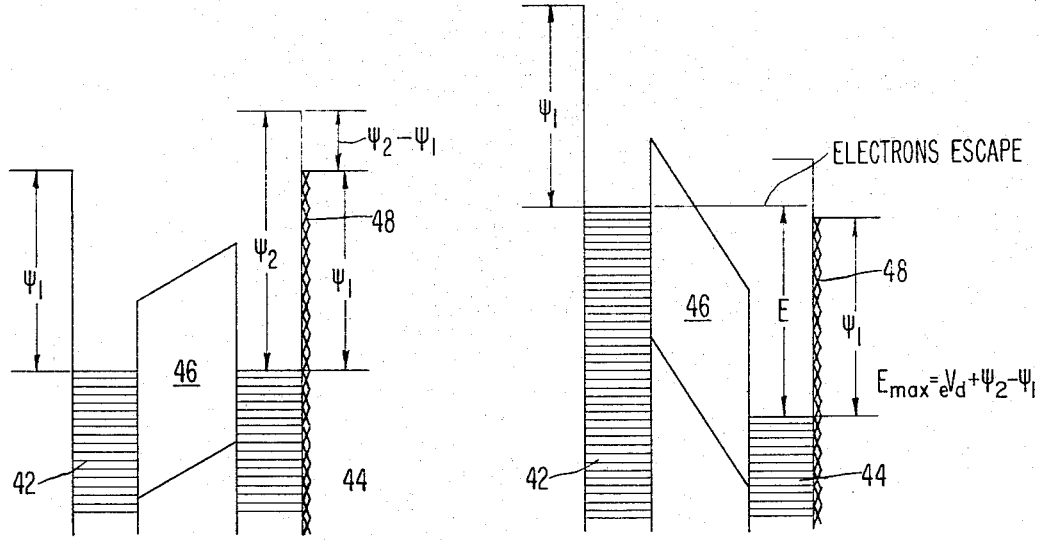
FIG. 9 represents an energy level diagram of a two electrode tunnel junction employing dissimilar electrodes with a monolayer of material of work function $\leq$ that of the first electrode applied to the second electrode.
FIG. 10 is an energy level diagram similar to FIG. 9 illustrating the conditions for maximum injection of electrons from the first to the second electrode.

However, if, as shown in FIGS. 9 and 10, a monolayer of material 48 of work function equal to or less than $\Psi_1$ is placed, e.g., by evaporation techniques, on the $\Psi_2$ material electrode at the metal vacuum interface, the electrons have only to overcome the work function of this added material layer, in order to escape into vacuum because such monolayer 48 acts to reduce the height of the barrier of electrode $\Psi_2$ to the height of $\Psi_1$. Thus the principles of employing dissimilar electrodes operates to aid in increasing the maximum energies of the electrons without the disadvantage of the electrons having to surmount a barrier higher than $\Psi_1$ namely, $\Psi_2$, in order to escape into vacuum. Forming such a structure is similar to the coating of thermionic cathodes in order to produce an increase in electron emission.

In the energy level diagram of FIG. 10, the injected electrons are shown to have a maximum energy $E_m$ of greater magnitude than the work function of the monolayer $\Psi_1$, i.e., the layer 48 is $\Psi_1$ or less, thus the electrons can escape, as a result of the additional injection energy $\Psi_2-\Psi_1$ available with this system over that which is obtainable from the systems of FIGS. 6 and 7.

The existence of this intrinsic field can be demonstrated on actual solid state electron tunnel junction devices as will now be described. Consider that a gradually increasing voltage is applied between two electrodes and wherein the electrode of lower work function is biased negatively. It will be observed that the initial increase in voltage decreases the intrinsic field $F_i$ to zero. Further, increase of potential gradually increases the field in the insulator $S$ until a critical field $F_d$ in the opposite direction is attained whereupon the junction breaks down. Such junctions exhibit polar dielectric strength characteristics. Under these conditions the breakdown voltage is given by:

$$V_1=(F_d+F_i)s$$

If a voltage bias of opposite polarity is now applied to the second junction, increasing the potential between electrodes gradually increases the field in the insulator from the intrinsic value $F_i$ until the breakdown field $F_d$ is attained, causing the junction to breakdown. Under these conditions breakdown voltage $V_2$ is given by:

$$V_2=(F_d-F_i)s$$

The difference in breakdown voltages $\Delta V=(V_1-V_2)$ can be expressed in terms of work functions of the electrodes as follows:

$$\Delta V=V_1-V=(F_d+F_i)s-(F_d-F_i)s$$
$$=2F_is$$
$$=2\left(\frac{\Psi_2-\Psi_1}{es}\right)s$$
$$=2\left(\frac{\Psi_2-\Psi_1}{e}\right)$$

Since the breakdown in tunnel junctions occurs at low voltages the difference $\Delta V$ should readily be observable.

In order to prove the foregoing a number of tunnel devices have been fabricated using Al—$Al_2O_3$ as the basic structure with counter electrodes of Al, Au, Sn and Be. Such structures have been fabricated as follows: Cr—Au contacts, suitably arranged to facilitate independent probe measurements were evaporated onto individual clean glass substrates in a vacuum of $<10^{-7}$ torr. Aluminum strips approximately 1/16 inch wide were next evaporated onto each substrate. The surfaces of the strips were oxidized by exposure to dry oxygen at atmospheric pressure. Finally a counter electrode 1/16 inch wide was deposited across the aluminum strips, each substrate having a counter-electrode of different material, thereby providing four different sets of tunnel junctions. The process was carried out in apparatus substantially similar to that described and claimed in copending application in the names of John G. Simmons, Douglas E. Moister, Jr., and David A. Starr, Jr., filed November 16, 1962, entitled Electronic Circuit Fabrication Apparatus, Serial No. 238,165.

The tunnel voltage-current characteristics exhibited by the symmetrical structures (Al—$Al_2O_3$—Al) were almost independent of polarity—slightly greater currents ($\sim 4\%$) were obtained when the oxidized electrode was positively biased. Such essentially non-polar characteristics were expected as a result of the symmetry of the potential barrier, see FIG. 1. The asymmetric structures (FIGS. 3-5)

(Al—$Al_2O_3$—Au; Al—$Al_2O_3$—Sn; and Al—$Al_2O_3$—Be)

exhibited polar characteristics, with the greatest value of current occurring when the aluminum electrode was positively biased. These results point up the fact that the barrier is asymmetric which indicates that a field exists in the insulator.

Such junctions have been tested to destruction with the oxidized aluminum electrode of successive junctions biased alternately, first positively, then negatively. The breakdown voltage for a given type junction and polarity of bias as set forth in the chart hereinbelow is extremely consistent, never varying by more than 3%. As seen in this chart the experimental mean values of $\Delta V$ for the junctions are compared with the theoretical values of $\Delta V$ where $\Psi_1$ refers to the work function of aluminum and $\Psi_2$ to the work function of the counter-electrode material.

| Junction | Experimental ΔV (volts) | Theoretical $\Delta V = \frac{(\Psi_2 - \Psi_1)}{e}$ |
|---|---|---|
| Al—Al₂O₃—Al | 0±.02 | 0 |
| Al—Al₂O₃—Au | 1.21±0.03 | 1.48 |
| Al—Al₂O₃—Sn | 0.67±0.03 | 0.60 |
| Al—Al₂O₃—Be | −0.37±0.03 | −0.32 |

Aluminum has a greater work function than beryllium and hence $\Psi_2 - \Psi_1$ is negative.

It should now be apparent both from the discussion hereinabove, as well as from a comparison of the experimental with the theoretical values as set forth in the aforementioned chart, that the existence of the intrinsic field in the insulator S has been proven.

Figure 11:
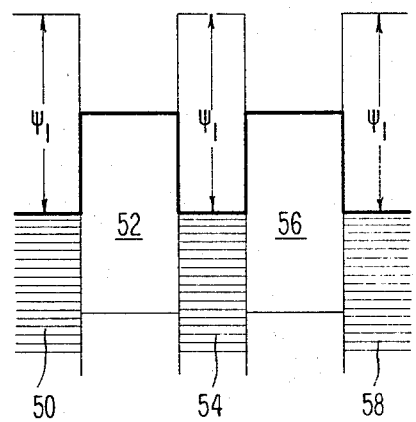
FIG. 11 represents an energy level diagram of a tunnel junction system utilizing similar metal electrodes in a triode arrangement.
Figure 12:
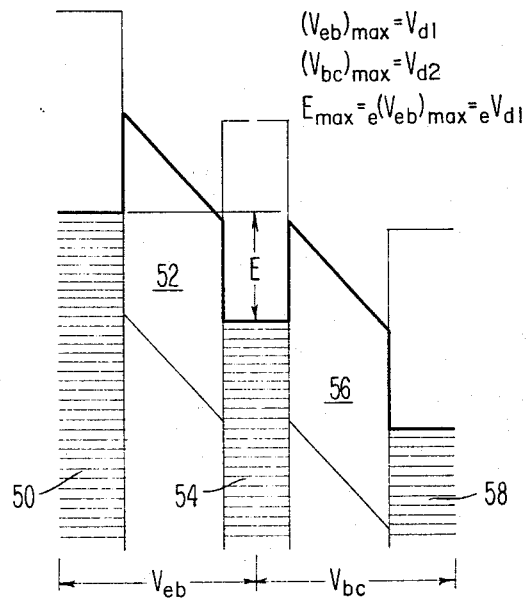
FIG. 12 is an energy level diagram for the apparatus of FIG. 11 illustrating the condition of the device when a potential is applied thereto.
Figure 13:
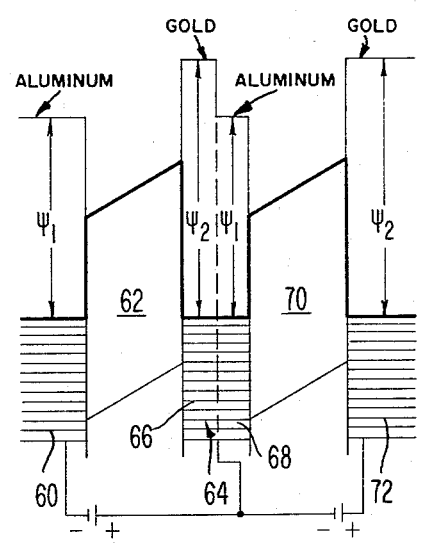
FIG. 13 represents an energy level diagram for a dissimilar metal triode tunnel junction.
Figure 14:
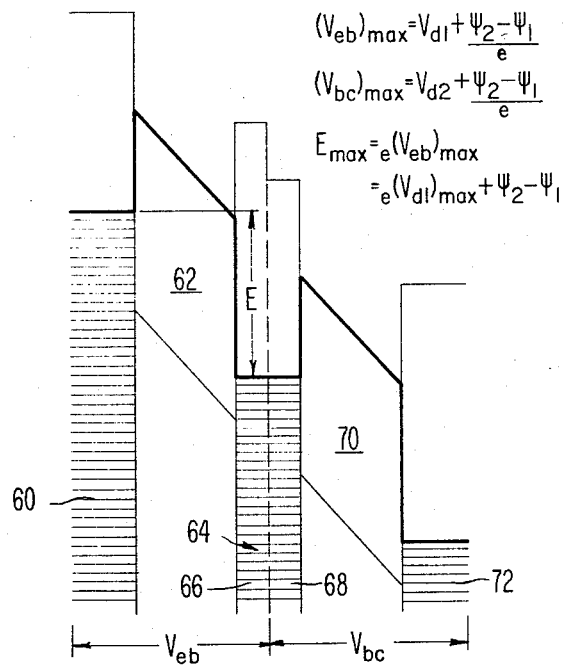
FIG. 14 is an energy level diagram illustrating the condition in the device when a potential is applied to the structure of FIG. 13.

FIGS. 11 and 12 are energy level diagrams for similar electrode multilayer tunnel junctions, e.g., triodes while FIGS. 13 and 14 are energy level diagrams for dissimilar electrode triodes. FIGS. 11 and 13 illustrate the condition in the respective structures when no bias is applied thereto. FIGS. 12 and 14 represent the same junctions with an applied bias. Both situations and structures will now be described.

Since the devices herein set forth have substantially similar electrode and bias arrangements to transistors, transistor terminology is used throughout the following description except where otherwise noted. This is not to be considered as a limitation on the inventive concept but simply an effort to make the description more readily understandable. In FIG. 11 there is illustrated the energy level diagram for a multielement device, including an emitter 50, a first insulator 52, a base 54, a second insulator 56 and a collector 58. The emitter, base and collector metals are all of similar materials and thus have similar work functions designated $\Psi_1$. No intrinsic field is apparent since no contact potential is developed in either of the insulators 52 and 56.

It is observed in FIG. 12 that where the voltage between the emitter 50 and base 54 is $V_{eb}$, and the voltage between the base 54 and the collector 58 is $V_{bc}$, the maximum voltage which can be applied between the emitter and the base is $V_{d1}$ which is the breakdown voltage of the insulator 52. The maximum voltage which can be applied between the base and the collector is $V_{d2}$ the breakdown voltage of the insulator 56.

The maximum energy between emitter and base is simply the product of the applied voltage $V_{eb}$ and the electronic charge $e$. Thus $E_{max} = e(V_{eb})_{max} = eV_{d1}$. With regard to the base-collector region of the device it is seen that the advantages of the intrinsic field is to permit greater voltage operation only since current injection from the base to the collector is precluded by making insulator 56 thicker than 100 A. Current from base to collector is undesirable in an operable device since it would amount to noise in the system. However, with the arrangement of FIGS. 13 and 14 it is possible to take advantage of the intrinsic field $F_i$ in the dielectric separating the electrodes due to the contact potential developed as a result of the dissimilar metals so as to produce higher injection energies. Such a dissimilar material multi-layer device is seen to include an emitter 60, e.g., aluminum of work function $\Psi_1$, a first insulator 62, e.g., aluminum oxide, a base 64, e.g., a double layer structure including a metal 66 of work function $\Psi_2$ (gold) and a metal 68 of work function $\Psi_1$ (aluminum), a second insulator 70, and a collector 72 of gold having a work function $\Psi_2$ and wherein the metal of higher work function $\Psi_2$ of the double layer base 64 is closest to the emitter and the $\Psi_1$ metal is closest to the collector. With this arrangement an intrinsic field is developed, as earlier described, in the emitter-base-insulator 62, as well as in the base-collector-insulator 70 (the collector metal (gold) being of higher work function than the base metal aluminum). This structural arrangement permits the application to both the emitter-base-electrodes 60–64 and the base-collector electrodes 64–72 of a higher voltage bias than was possible with the similar electrode device of FIGS. 11 and 12 by an amount equal to $(\Psi_2 - \Psi_1/e)$.

As seen in FIG. 14 where the voltages applied between emitter 60 and base 64, and between base 64 and the collector 72 are $V_{eb}$ and $V_{bc}$, respectively, both of these voltages are thereby increased by an amount equal to $(\Psi_2 - \Psi_1/e)$. Thus $(V_{eb})_{max} = V_{d1} + (\Psi_2 - \Psi_1/e)$ and $(V_{bc})_{max} = V_{d2} + (\Psi_2 - \Psi_1/e)$, which means that the electron injection energy E of the emitter base region is increased by the difference in work functions of the dissimilar metals employed therewith, i.e., $$E_{max} = e(V_{eb})_{max} = e(V_{d1})_{max} + \Psi_2 - \Psi_1$$

In the most stringent situation, i.e., where the operation is very close to the dielectric breakdown strength of the insulators, there is an additional advantage in that greater voltages can be put across the insulators before breakdown occurs. Thus, greater injection energies are permitted from emitter to base and a greater range of working voltages are permitted between base and collector.

It should be readily apparent that the invention as hereinbefore described can be adapted to the fabrication of a variety of multi-layer devices other than those set forth hereinabove such, for example, as tetrodes, pentodes, etc.

For the solid state electron tunnel junction diode arrangement a useful, i.e., working range of D.-C. voltage has been found to be from 0 to 4 volts maximum. Utilizing voltage pulses this range can be extended to from 10 to 20 volts.

The emitter-base insulator for the present apparatus should be thick enough to prevent electrical breakdown in use, i.e., when working voltages are applied across it, e.g., greater than 1 volt or conversely this member should be thin enough to obtain appreciable current densities.

The base-collector insulator should be thicker than approximately 100 A., i.e., thick enough to preclude tunneling.

The base material layer should be less than the mean free path of an electron, i.e., this member should be transparent to the tunneling electrons so that the electrons undergo no energy losses while traversing the base layer.

The physical geometry of the material forming the emitter-base-insulator should be such that the potential barrier of the insulating film, oxide, etc., is of a height such as to preclude thermionic emission but insufficient in height to prevent appreciable tunneling currents from being developed, e.g., 1 electron volt high. With respect to the base-collector material layer this film should present a barrier of sufficient height to prevent thermionic emission between base and collector but sufficiently low so as to avoid the requirement of relatively high injection energies that would otherwise be necessary in order for the injected electrons to surmount the barrier.

What is claimed is:

1. Active thin film quantum mechanical tunneling apparatus comprising:
   (a) a first and a second pair of conductive material layers, at least one of the conductive layers of each pair being of different relative work function than the other material layer thereof,
   (b) each of said pairs of layers of conductive material being separated by an insulating layer whereby a contact potential is developed between said pairs of conductive layers inducing an intrinsic field in the respective insulator permitting electrons to tunnel from the lower work function material to the higher work function material,
   (c) the material layer of higher work function of one pair of materials being arranged in contact with the material layer of lower work function of the other pair of materials, (d) means biasing the lower work function material of one of said pairs of conductive layers negatively while biasing the higher work function material of the other pair of conductive layers positively with respect to the remaining layers effectively increasing the electron injection energy of electrons tunneling from said lower to said higher work function materials producing a gain of better than two-to-one upon energization of said apparatus.

2. Active thin film quantum mechanical tunneling apparatus comprising:

(a) first and second electrically conductive dissimilar metal layers of different relative work functions separated by a first insulating layer having the thickness of the order of the mean free path of an electron whereby a contact potential is developed therebetween resulting in an intrinsic field in the insulator as a result of a difference in work function of the two dissimilar metal layers, (b) an electrically conductive layer of metal of a work function less than the work function of said second metal layer disposed in surface contact with said second metal layer effective to reduce the height of the barrier of the second metal layer relative to that of the first metal layer thereby to aid in increasing the maximum energies of the electrons thus enabling the electrons to escape from said last mentioned conductive layer, (c) a second insulating layer disposed on said last named conductive layer of low work function metal, (d) an electrically conductive metal layer of a work function similar to said second electrically conductive metal layer disposed on said second insulating layer, and (e) means negatively biasing the low work function conductive layers of the first pair of layers while positively biasing the higher work function conductive layers of the second pair of layers with respect to the layers of alternate work functions whereby an electron injection energy gain of better than two-to-one is attained.

3. Active thin film quantum mechanical tunneling apparatus comprising:

(a) a conductive metal layer of aluminum characterized as an emitter member of a thickness sufficient to provide a low resistive film, (b) a conductive metal layer of gold characterized as a base member of a thickness less than the mean free path of an electron so that this member is transparent to the tunneling electrons whereby the electrons undergo no energy losses while traversing said base member, (c) an electrically insulating layer of the order of 50 A. or less in thickness interposed between said emitter member and said base member thick enough to prevent electrical break-down with working voltages applied across it greater than one volt and thin enough to obtain appreciable current densities effective to establish an intrinsic electric field induced in said insulating layer as a result of the contact potential difference between the emitter and base layers due to the difference in relative work functions of these two layers, (d) a conductive layer of aluminum overlaid on said base layer, (e) a conductive layer of gold characterized as a collector member, (f) an electrically insulating layer interposed between said aluminum base member and said gold collector member thicker than approximately 100 A., said base-collector material layer effectively presenting a barrier of sufficient height to prevent thermionic emission between base and collector members but sufficiently low so as to avoid the requirement of relative injection energies for the injected electrons to surmount the barrier, and (g) means connecting said conductive metal layers to a source of electrical potential whereby the injecting metal layer of aluminum of lower work function is biased negatively relative to the base and collector layers of gold thereby increasing the injection energy of the electrons tunneling from emitter to base and from base to collector by the order of better than two-to-one as a result of the intrinsic field developed in the emitter base and base collector insulators.

References Cited by the Examiner

UNITED STATES PATENTS

| | | | |
|---|---|---|---|
| 2,527,981 | 10/1950 | Bramley | 313—92 X |
| 2,702,360 | 2/1955 | Giacoletto | 317—234 |
| 2,786,166 | 3/1957 | Poganski | 317—234 |
| 2,960,659 | 11/1960 | Burton | 317—234 |
| 3,024,140 | 3/1962 | Schmidlin | 317—234 X |
| 3,056,073 | 9/1962 | Mead | 317—234 |
| 3,105,166 | 9/1963 | Choyke et al. | 313—358 X |
| 3,116,427 | 12/1963 | Giaever | 307—88.5 |
| 3,121,177 | 2/1964 | Davis | 307—88.5 |
| 3,121,809 | 2/1964 | Atalla | 307—88.5 |
| 3,150,282 | 9/1964 | Geppert | 317—235 X |

FOREIGN PATENTS 1,060,881  7/1959  Germany.

JOHN W. HUCKERT, *Primary Examiner.*

DAVID J. GALVIN, *Examiner.*

A. S. KATZ, J. D. KALLAM, R. F. POLISSACK,
*Assistant Examiners.*